(12) United States Patent
Ishihara

(10) Patent No.: US 11,691,548 B2
(45) Date of Patent: Jul. 4, 2023

(54) SEAT

(71) Applicant: TS TECH CO., LTD., Asaka (JP)

(72) Inventor: Minako Ishihara, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/613,790

(22) PCT Filed: May 12, 2020

(86) PCT No.: PCT/JP2020/018960
§ 371 (c)(1),
(2) Date: Nov. 23, 2021

(87) PCT Pub. No.: WO2020/241241
PCT Pub. Date: Dec. 3, 2020

(65) Prior Publication Data
US 2022/0227270 A1 Jul. 21, 2022

(30) Foreign Application Priority Data

May 30, 2019 (JP) ................................. 2019-101830

(51) Int. Cl.
*A47C 7/74* (2006.01)
*B60N 2/885* (2018.01)
(Continued)

(52) U.S. Cl.
CPC ........... *B60N 2/5657* (2013.01); *B60N 2/002* (2013.01); *B60N 2/879* (2018.02)

(58) Field of Classification Search
CPC ......... B60N 2/5657; B60N 2/879; B60N 2/80
See application file for complete search history.

(56) References Cited

U.S. PATENT DOCUMENTS 10,743,671 B2  8/2020 Akaike et al.
11,272,789 B2 * 3/2022 Tanaka ................. A47C 31/007
(Continued)

FOREIGN PATENT DOCUMENTS

JP  H 02-082947   6/1990
JP  H 04-004853   1/1992
(Continued)

OTHER PUBLICATIONS

International Search Report with English Translation issued in PCT/JP2020/018960 dated Jul. 21, 2020 (13 pages).
(Continued)

*Primary Examiner* — Shin H Kim
(74) *Attorney, Agent, or Firm* — Dority & Manning, P.A.

(57) ABSTRACT

A car seat includes an air outlet located in a seat upper portion (a portion provided above a seat cushion and including a seat back and a headrest) to let out air therethrough; an air inlet located in the seat upper portion to draw in air therethrough; at least one fan configured to produce a current of air flowing from the air outlet toward the air inlet at a front side of the seat upper portion; and a scenting device configured to scent air to be forced out through the air outlet. The air outlet and the air inlet are located in such positions that at least part of the headrest is positioned between the air outlet and the air inlet in a direction from the air outlet toward the air inlet as viewed from a front side.

14 Claims, 12 Drawing Sheets

(51) Int. Cl.
*B60N 2/90* (2018.01)
*B60N 2/56* (2006.01)
*B60N 2/879* (2018.01)
*B60N 2/00* (2006.01)

(56) References Cited

U.S. PATENT DOCUMENTS

| | | |
|---|---|---|
| 2010/0130808 A1 | 5/2010 | Hattori |
| 2018/0160816 A1 | 6/2018 | Akaike et al. |
| 2022/0227270 A1* | 7/2022 | Ishihara ................. B60N 2/885 |

FOREIGN PATENT DOCUMENTS

| | | |
|---|---|---|
| JP | H 10-248674 | 9/1998 |
| JP | 2006-273146 | 10/2006 |
| JP | 2007-283932 | 11/2007 |
| JP | 2008-179264 | 8/2008 |
| JP | 2011-245073 | 12/2011 |
| JP | 2017-109635 | 6/2017 |
| JP | 2017-154617 | 9/2017 |
| JP | 2017-226332 | 12/2017 |
| JP | 2018-093921 | 6/2018 |

OTHER PUBLICATIONS

Japanese Office Action (w/ English translation) for corresponding Japanese Application No. 2019-101830, dated May 9, 2023, 8 pages.

* cited by examiner

SEAT

CROSS REFERENCE TO RELATED APPLICATIONS

This application is the U.S. National Stage entry of International Application No. PCT/JP2020/018960 filed under the Patent Cooperation Treaty and having a filing date of May 12, 2020, which claims priority to Japanese Patent Application No. 2019-101830 having a filing date of May 30, 2019, both of which are incorporated herein by reference.

TECHNICAL FIELD

The present invention relates to a seat with a seat cushion, a seat back, and a headrest.

BACKGROUND ART

An air-conditioning seat having a seat back formed with projecting portions which can cover the left and right sides of the head of a seated person as if the head of the seated person is lapped therebetween, such that the left and right projecting portions have slit-shaped air outlets configured to allow air supplied from a blower to blow leftward and rightward on the head of the seated person is hitherto known in the art (Patent document 1). In this technical scheme, ducts leading to the air outlets are connected to tubes in which air passing through the ducts can be made fragrant with a scent supplied from a scenting device, so that fragrantly scented air having an effect of increasing the comfort such as a relaxing effect, etc. can be blown toward the face and its vicinities of the seated person who can thereby get exposed to comfortable air.

CITATION LIST

Patent Literature

Patent Document 1: JP 2018-93921 A

SUMMARY OF INVENTION

The hitherto-known seat, however, would allow air let out through the air outlets to diffuse, and could not efficiently deliver a scent to the seated person. Moreover, the hitherto-known seat would also have a disadvantage of unnecessarily allowing the scent to reach any other person nearby.

Therefore, it is an object of the present invention to provide a seat which can efficiently deliver a scent to a seated person.

It is another object to restrain a scent from being delivered unnecessarily.

It is yet another object to provide a variety of scents exchangeable according to preferences.

It is yet another object to deliver a scent appropriate to the state of a seated person.

It is yet another object to improve an advantageous effect of a scent.

A seat, contrived to achieve any of the objects mentioned above, is a seat with a seat cushion and a seat upper portion provided above the seat cushion, the seat upper portion including a seat back and a headrest, the seat comprising: an air outlet located in the seat upper portion to let out air therethrough; an air inlet located in the seat upper portion to draw in air therethrough; at least one fan configured to produce a current of air flowing at a front side of the seat upper portion from the air outlet toward the air inlet; and a scenting device configured to scent air to be forced out through the air outlet, wherein the air outlet and the air inlet are located in such positions that at least part of the headrest is positioned between the air outlet and the air inlet in a direction of the current of air flowing from the air outlet toward the air inlet as viewed from a front side.

With this configuration, the air made fragrant with a scent and forced out through the air outlet is drawn in through the air inlet, whereby a current of fragrant air is formed so that the scent is restrained from diffusing; therefore, the scent can be delivered efficiently to the seated person.

The seat as described above may be configured such that the air outlet and the air inlet are located in such positions that a straight line connecting the air outlet and the air inlet intersects the headrest as viewed from the front side.

With this configuration, as viewed from the front side, the fragrant scent flowing from the air outlet toward the air inlet blows on the head of a seated person positioned at the front side of the headrest, so that the scent can be delivered more efficiently to the seated person.

The seat as described above may be configured such that the air outlet is located at one of left and right sides of the seat upper portion, and the air inlet is located at another of the left and right sides of the seat upper portion.

With this configuration, a current of fragrant air can be caused to flow from one of the left and right sides toward the other of the left and right sides as if it brushes past a seated person; therefore, the scent can be delivered more efficiently to the seated person.

The seat as described above may be a seat installed in a vehicle and configured such that the air outlet is located at a laterally inner side in the vehicle, and the air inlet is located at a laterally outer side in the vehicle.

With this configuration, a current of fragrant air is caused to flow from the laterally inner side toward the laterally outer side in the vehicle; therefore, the fragrant air with a scent as let out through the air outlet can be restrained from being delivered unnecessarily to the laterally opposite side that is upstream in the direction of the current.

The seat as described above may be configured such that the air outlet and the air inlet are located in the headrest.

With this configuration, a current of fragrant air can be caused to flow near the head of a seated person; therefore, the scent can be delivered more efficiently to the seated person.

The seat as described above may be configured such that the headrest includes a headrest body located at a rear side of a head of a seated person, and a pair of left and right protrusions protruding from the headrest body frontward, the pair of left and right protrusions being located at left and right sides of the head of the seated person such that the head of the seated person is be positioned therebetween, wherein the air outlet is located at one of the pair of left and right to protrusions, and the air inlet is located at another of the pair of left and right protrusions.

With this configuration, a current of fragrant air can be caused to flow as if it brushes past the nose of a seated person; therefore, the scent can be delivered much more efficiently to the seated person.

The seat as described above may be configured such that the air outlet is located in one of the seat back and the headrest, and the air inlet is located in another of the seat back and the headrest.

With this configuration, a current of fragrant air can be caused to flow near the head of a seated person; therefore, the scent can be delivered more efficiently to the seated person.

The seat as described above may be configured such that the air outlet and the air inlet are located in an upper portion of the seat back.

With this configuration, a current of fragrant air can be caused to flow near the head of a seated person; therefore, the scent can be delivered more efficiently to the seated person.

The seat as described above may be configured such that the scenting device is detachable and attachable.

With this configuration, the type of scent can be changed according to preferences.

The seat as described above may be configured to comprise: a state detection sensor located at at least one of the seat cushion and the seat upper portion to acquire a measurement value for determining a state of a seated person; and a controller, wherein the scenting device includes fragrance emitters of a plurality of kinds, and the controller is configured to determine the state of the seated person based on the measurement value, and to switch from one fragrance emitter to another of the fragrance emitters depending on the state of the seated person.

This configuration makes it possible to deliver a scent appropriate to the state of a seated person.

The seat as described above may be configured to comprise: an odor sensor located downstream of the air inlet in the direction of the current of air; and a controller, wherein the scenting device includes fragrance emitters of a plurality of kinds, and the controller is configured to determine a state of a seated person based on a detection result of the odor sensor, and to switch from one fragrance emitter to another of the fragrance emitters depending on the state of the seated person.

This configuration makes it possible to deliver a scent appropriate to the state of a seated person.

The seat as described above may be configured to comprise a deodorizing filter located upstream of the scenting device in the direction of the current of air.

With this configuration, any smell which air could carry before getting scented can be reduced, so that such original smell of the air can be restrained from being mixed with the scent with which to make the air fragrant; therefore, the advantageous effect of the scent provided by the scenting device can be improved.

The seat as described above may be configured such that the fan includes a blower fan for forcing air out through the air outlet, and a suction fan for forcing air in through the air inlet.

The seat as described above may be configured to comprise an air passage provided in the seat upper portion and connecting the air inlet and the air outlet, wherein the fan is located in the air passage and configured to force air from the air inlet toward the air outlet.

DESCRIPTION OF EMBODIMENTS

Next, a description will be given of a first embodiment of the invention. In this description, the front/rear (frontward/rearward), left/right (leftward/rightward; lateral), and upper/lower (upward/downward) are designated with reference to the front/rear, left/right and upward/downward directions for a person seated on a seat (i.e., seated person or occupant).

Figure 1:
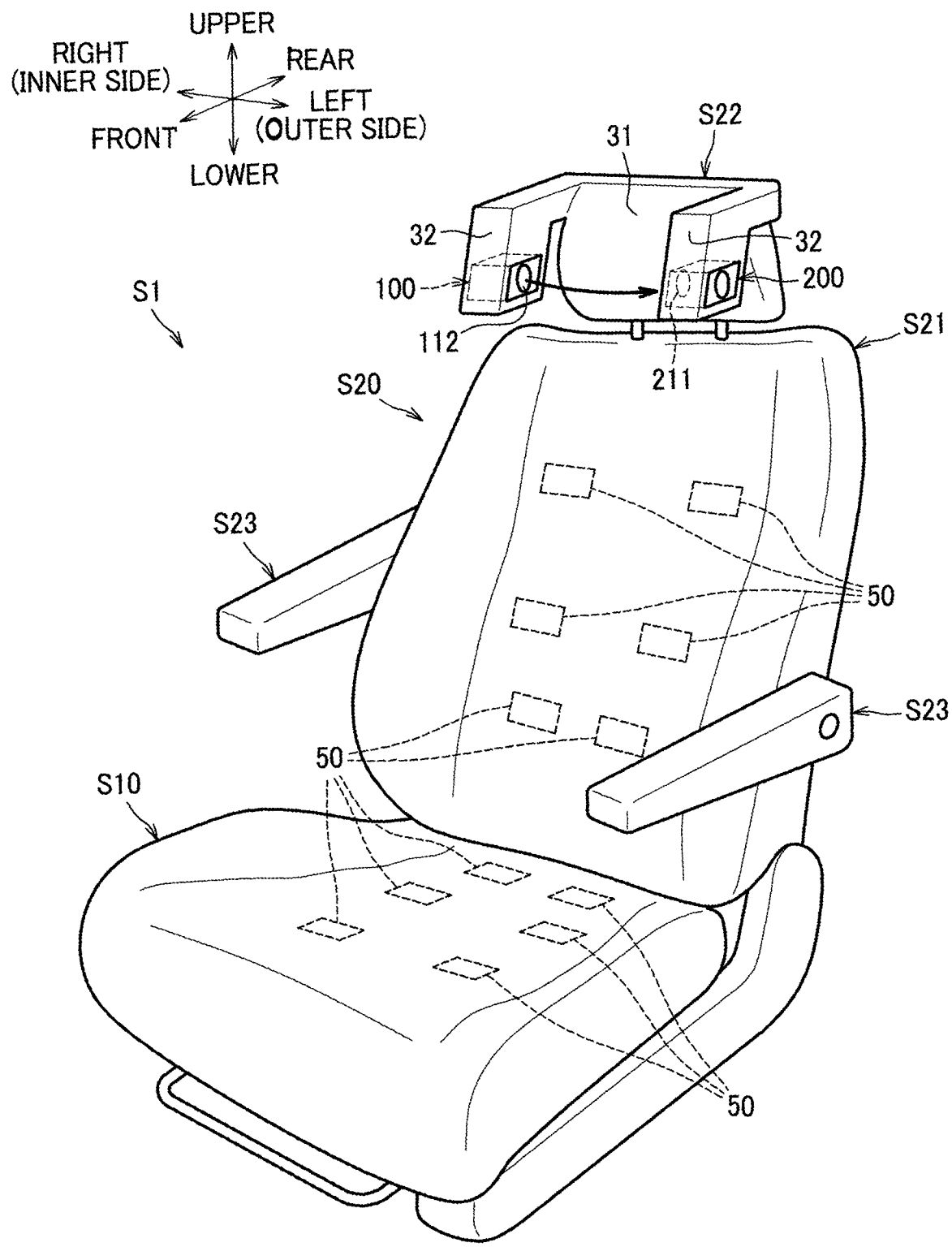
FIG. 1 is a perspective view of a car seat according to a first embodiment.
Figure 2:
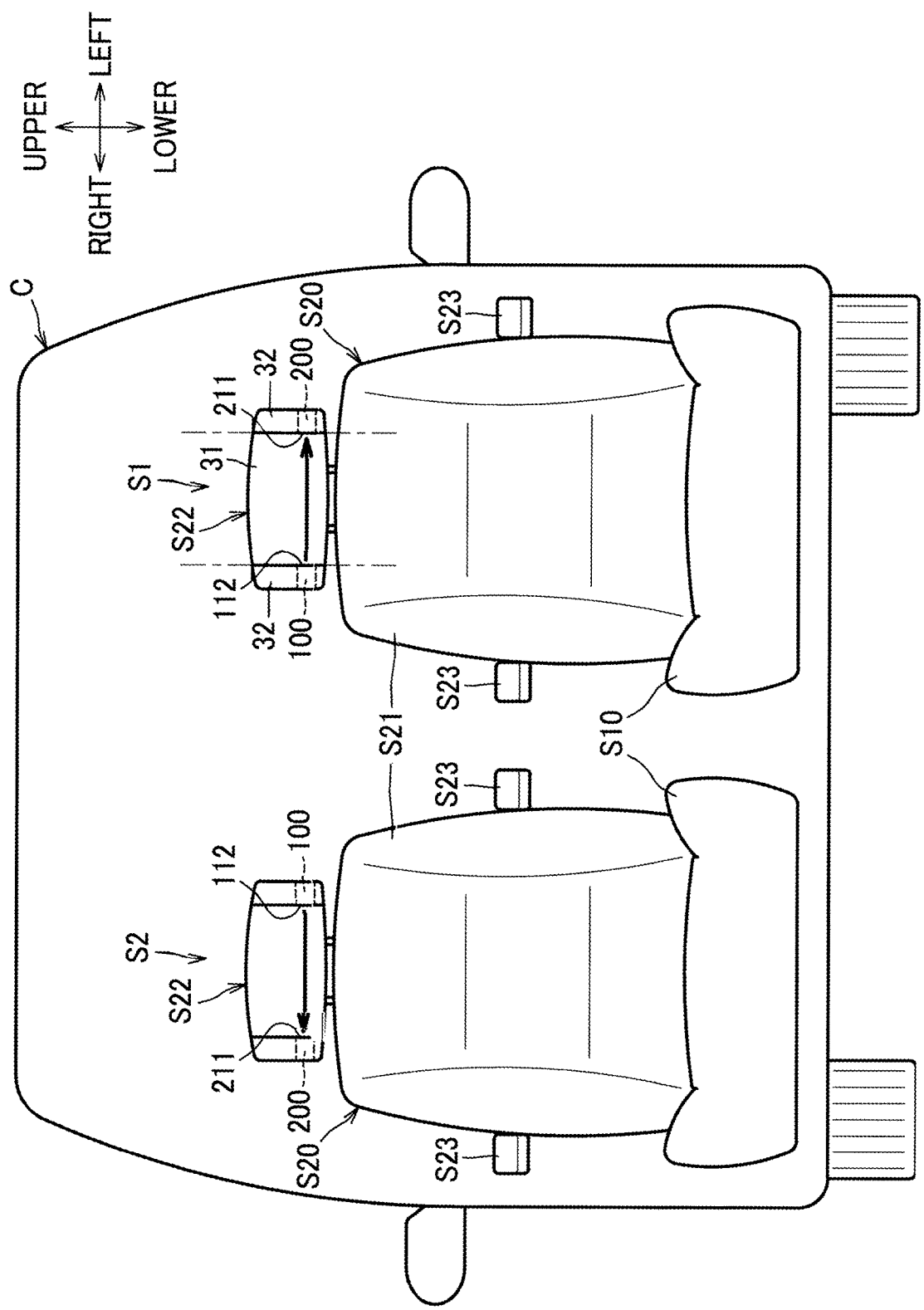
FIG. 2 is a diagram showing an automobile in which car seats are installed.

As shown in FIG. 1, a seat according to this embodiment is configured as a vehicle seat to be installed in a vehicle, specifically, a car seat S1 to be installed in an automobile C (see FIG. 2).

Referring now to FIG. 2, in the automobile C, a car seat S1 and a car seat S2 are installed. The car seat S2 is arranged side by side with the car seat S1, particularly, at the right side of the car seat S1. The car seat S2 is configured to be approximately symmetric (left-right reversed) to the car seat S1.

Referring back to FIG. 1, the car seat S1 includes a seat cushion S10 and a seat upper portion S20 that is a portion provided above the seat cushion S10. The seat upper portion S20 includes a seat back S21 and a headrest S22. To be more specific, the seat upper portion S20 includes a seat back S21, a headrest S22, and left and right armrests S23.

The seat cushion S10, and the seat back S21 of the seat upper portion S20 has a plurality of state detection sensors 50 located thereat. Each state detection sensor 50 is a sensor configured to acquire a measurement value for determining a state of a seated person seated on the car seat S1. Herein, the state of a seated person refers to a state including a frame of mind of the seated person, such as a state of his/her emotion being excited or not, a state of his/her nerve being irritated or not, a state of being drowsy or not, etc.

The state detection sensor 50 is a sensor capable of sensing the state of a seated person, and examples thereof include a heartbeat sensor, a respiration sensor, etc. For example, when a heart rate as measured by the heartbeat sensor or the like is higher than usual, a state of excitement or a state of irritation may be presumed to have arisen; when the heart rate is lower than usual, a drowsy state may be presumed to have arisen. Further, for example, when a respiration rate as measured by the respiration sensor or the like is lower than usual, a drowsy state may be presumed to have arisen. For the heartbeat sensor and the respiration sensor, pressure sensors may be used, for example. Thus, the heartbeat or respiration can be determined from variation in the measurement value (pressure value) acquired by the pressure sensors.

The plurality of state detection sensors 50 may all be sensors of the same type, or consist of a mix of sensors of different types. To be more specific, for example, the plurality of state detection sensors 50 may all be heartbeat sensors, or may all be respiration sensors, or may consist of heartbeat sensors and respiration sensors as mixedly arranged.

The headrest S22 has a blower unit 100 and a suction unit 200 located therein. Specifically, the headrest S22 includes a headrest body 31 located at a rear side of a head of a seated person, and a pair of left and right protrusions 32 protruding from left and right ends of the headrest body 31 frontward. The pair of left and right protrusions 32 are located in such to positions that the head of the seated person is to be positioned between the pair of left and right protrusions 32 located at left and right sides of the head of the seated person. In other words, the head of a person when seated will lie between the pair of left and right protrusions 32. The blower unit 100 is located at the right protrusion 32, and the suction unit 200 is located at the left protrusion 32.

Figure 3:
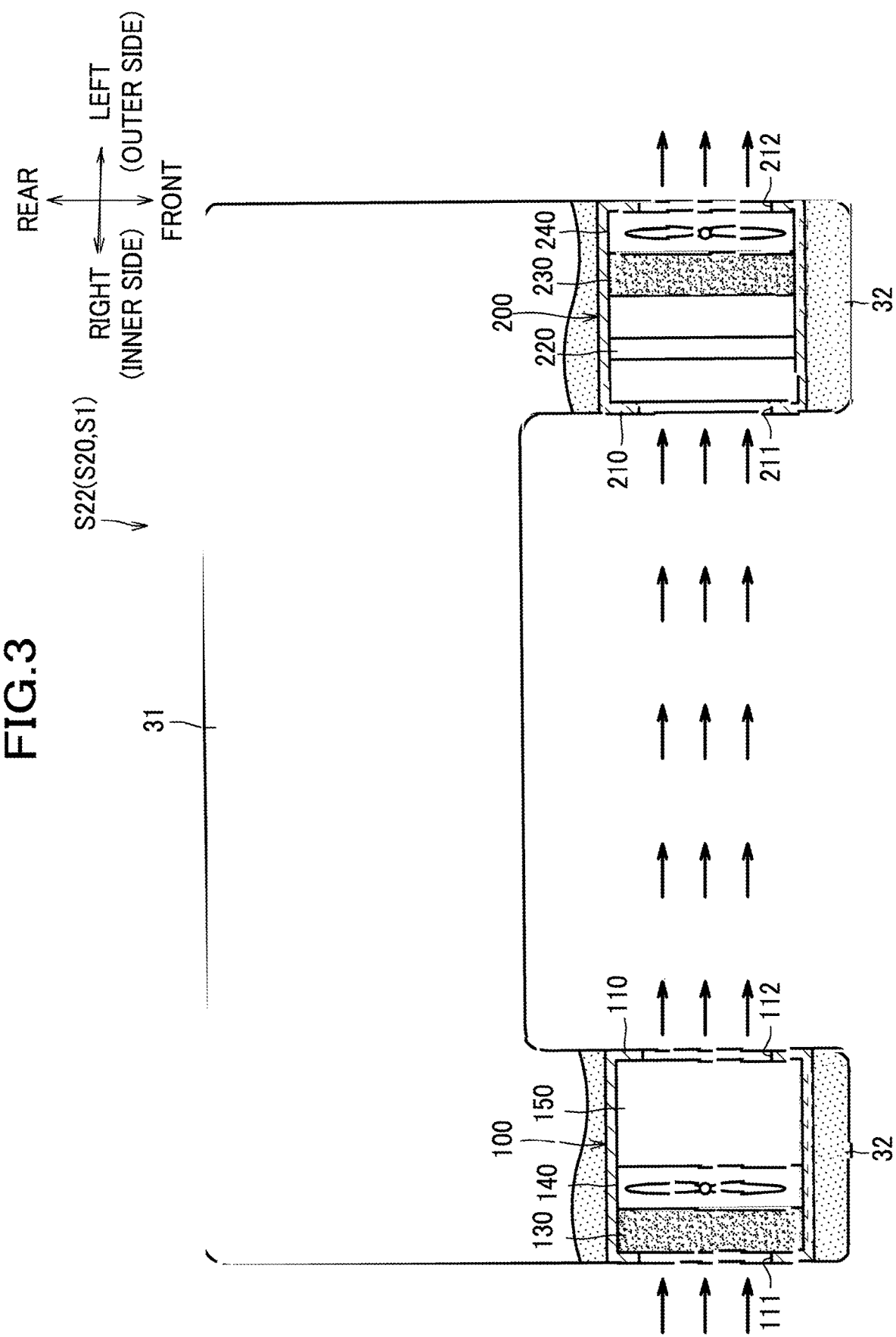
FIG. 3 is a diagram showing a structure of a headrest.
Figure 4:
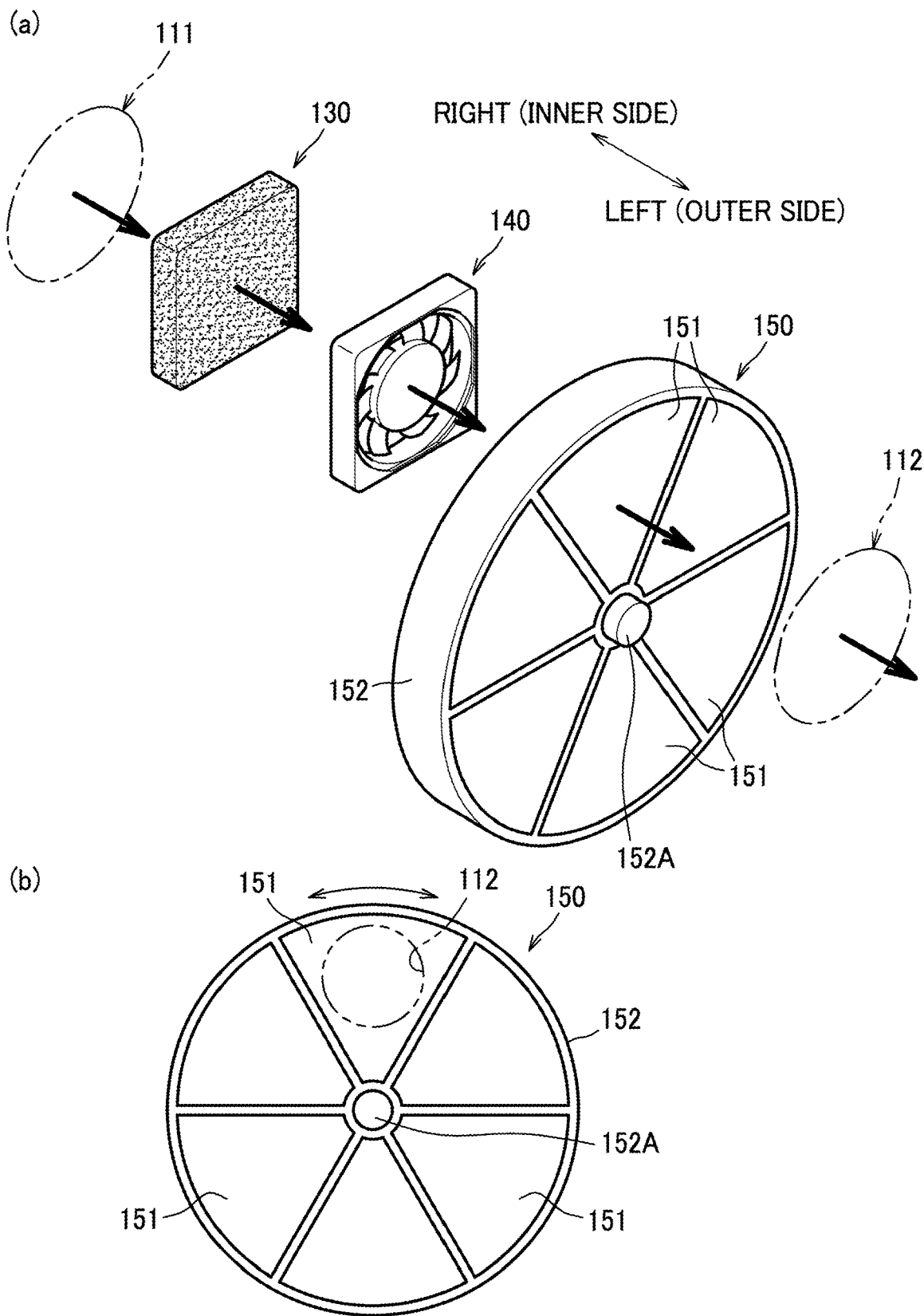
FIG. 4 includes (a) a perspective view showing a deodorizing filter, a blower fan and a scenting device, and (b) a side view of the scenting device as seen from a laterally outer side.

As shown in FIG. 3 and FIG. 4(*a*), the blower unit 100 is a device configured to force air made fragrant with a scent to come out, and includes a case 110, a deodorizing filter 130, a blower fan 140, and a scenting device 150.

The case 110 is a member that contains the deodorizing filter 130, the blower fan 140 and the scenting device 150, and has an intake port 111 through which to take in air, and an air outlet 112 through which to let out air.

The deodorizing filter 130 is a filter for removing odor from air taken in through the intake port 111, and is located upstream of the scenting device 150 in a direction of a current of air as indicated by arrows in the drawings.

The blower fan 140 is a fan for forcing air out through the air outlet 112, and is located downstream of the deodorizing filter 130 and upstream of the scenting device 150. In other words, the blower fan 140 is located between the deodorizing filter 130 and the scenting device 150.

As shown in FIG. 4(*a*), (*b*), the scenting device 150 is a device configured to scent air to be forced out through the air outlet 112 by the air blower 140. The scenting device 150 includes fragrance emitters 151 of a plurality of kinds, and a frame 152 that supports the fragrance emitters 151.

Each of the fragrance emitters 151 is a member made of an air-permeable material impregnated with one of fragrant scents different from each other, such as fragrant olive, jasmine, mint, and grapefruit aromas, etc. In this embodiment, the scenting device 150 includes six fragrance emitters 151 as a plurality of fragrance emitters 151; it is, however, to be understood that any number of fragrance emitters 151 may be provided.

The frame 152 is supported rotatably about a shaft 152A relative to the case 110.

The scenting device 150 is located in the case 110, such that one of the plurality of fragrance emitters 151 is positioned between the blower fan 140 and the air outlet 112. The scenting device 150 is provided such that a fragrance emitter 151 positioned between the blower fan 140 and the air outlet 112 can be changed to another by a controller 300, as will be described later, controlling the phase of the frame 152. The blower unit 100 is configured such that when the blower fan 140 is actuated, air thereby caused to pass through the fragrance emitter 151 positioned between the blower fan 140 and the air outlet 112 is made fragrant with a scent with which that fragrance emitter 151 is impregnated, and let out through the air outlet 112.

Figure 5:
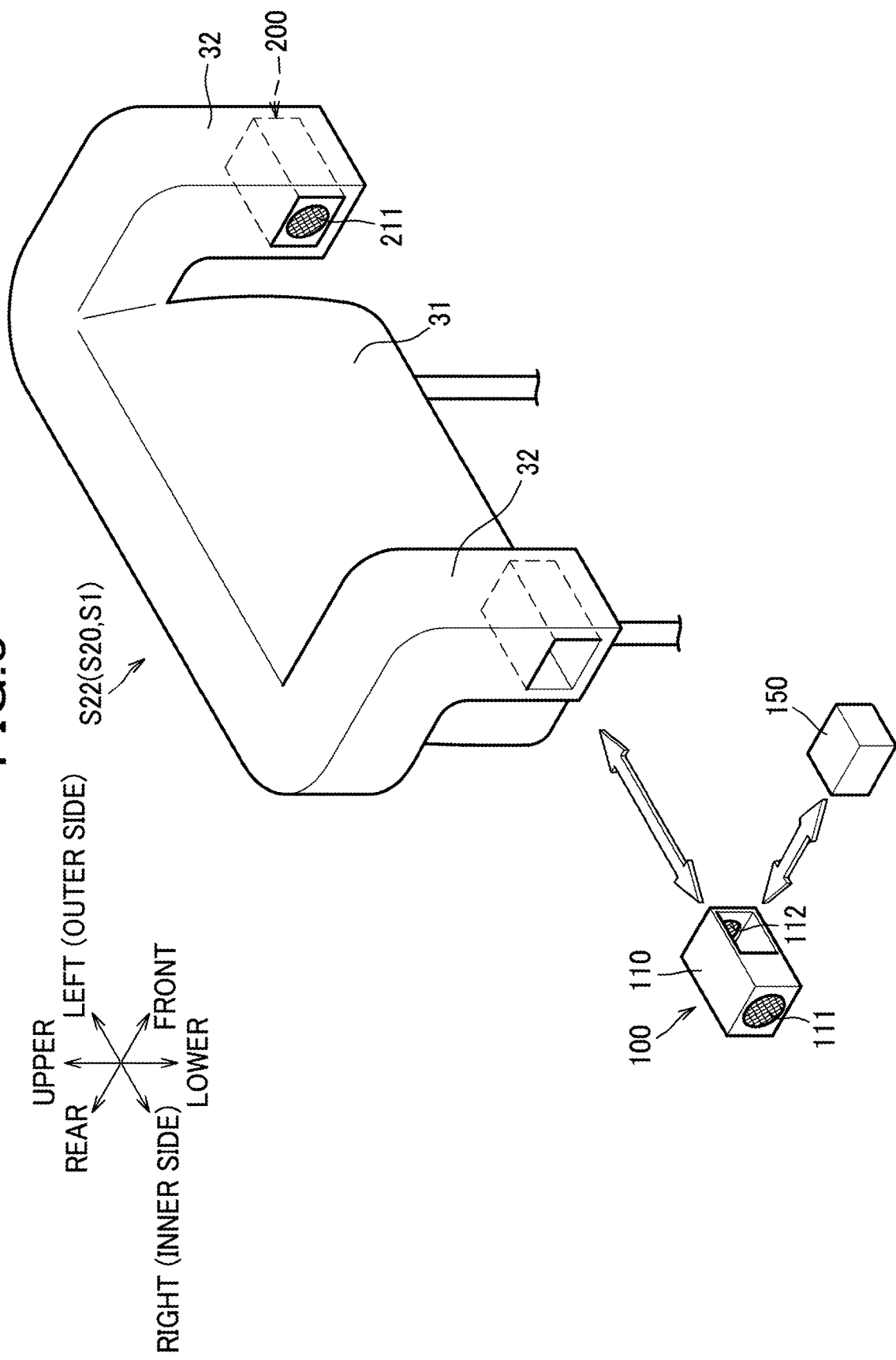
FIG. 5 is a schematic diagram for explaining attachment and detachment of the scenting device.

As shown in FIG. 5, the scenting device 150 is detachable from and installable in the headrest S22 of the seat upper portion S20. To be more specific, the blower unit 100 is detachable from and installable in the headrest S22, and the scenting device 150 is detachable from and installable in the case 110 of the blower unit 100. Although not illustrated in the drawings, the suction unit 200 is also detachable from and installable in the headrest S22. In the present embodiment, the blower unit 100 is configured to be detachable from the right protrusion 32 rightward, i.e., on a right side opposite to a side on which a person is to come when seated; the suction unit 200 is configured to be detachable from the left protrusion 32 leftward, i.e., on a left side opposite to the side on which a person is to come when seated.

The scenting device 150 may be configured such that each of the fragrance emitters 151 (see FIG. 4) is detachable from and installable in the frame 152 so that the fragrance emitters 151 can be changed individually to a new one or to one having a different scent.

As shown in FIG. 3, the suction unit 200 is a device configured to suck air, and includes a case 210, an odor sensor 220, a second deodorizing filter 230, and a suction fan 240.

The case 210 is a member that contains the odor sensor 220, the second deodorizing filter 230, and the suction fan 240, and has an air inlet 211 through which to suck in air, and an exhaust port 212 through which to discharge air.

The odor sensor 220 is a sensor that detects an odor of air taken in through the air inlet 211, and is located downstream of the air inlet 211 in the direction of the current of air. In this embodiment, the odor sensor 220 acquires a measurement value for checking a state of health, a state of mind, or the like of a seated person from the properties, such as the types and/or intensities, of the components of body odor of the seated person as contained in air taken in through the air inlet 211.

The second deodorizing filter 230 is a filter for removing odor from air taken in through the air inlet 211 and having flowed across the odor sensor 220, and is located downstream of the odor sensor 220 in the direction of the current of air.

The suction fan 240 is a fan for drawing in air through the air inlet 211, and is located downstream of the second deodorizing filter 230 in the direction of the current of air. The suction fan 240 and the blower fan 140 of the blower unit 100 are fans configured to produce a current of air flowing at a front side of the seat upper portion S20 from the air outlet 112 toward the air inlet 211. That is, in the present embodiment, the car seat S1 comprises two fans, to be more specific, the blower fan 140 and the suction fan 240, as "(at least one) fan" according to the invention.

Next, a description will be given of arrangement of the air outlet 112 and the air inlet 211 in the car seat S1 of the present embodiment.

As shown in FIG. 1, the air outlet 112 and the air inlet 211 are both located in the seat upper portion S20. To be more specific, the air outlet 112 is located at one of left and right sides, specifically, at the right side, of the seat upper portion S20, whereas the air inlet 211 is located at the other of the left and right sides, specifically, at the left side, of the seat upper portion S20. In other words, for the car seat S1, the air outlet 112 is located at a laterally inner side in the automobile C, that is, located on a side on which the adjacent car seat S2 (see FIG. 2) is located, and the air inlet 211 is located at a laterally outer side in the automobile C, that is, located on a side opposite to the side on which the car seat S2 is located.

More specifically, the air outlet 112 and the air inlet 211 are both located in the headrest S22 that is a constituent part of the seat upper portion S20. To elaborate, the air outlet 112 is located at one of the pair of left and right protrusions 32, specifically, at the right protrusion 32, whereas the air inlet 211 is located at the other of the pair of left and right protrusions 32, specifically, at the left protrusion 32. For that matter, the air outlet 112 is located in a laterally outer side surface of the right protrusion 32, and the air inlet 211 is located in a laterally inner side surface of the left protrusion 32, so that the air outlet 112 and the air inlet 211 face each other in laterally opposite directions.

As shown in FIG. 2, the air outlet 112 and the air inlet 211 are located in such positions that part of the headrest S22, specifically, a central portion (a portion except the left and right end portions) of the headrest body 31, is positioned between the air outlet 112 and the air inlet 211 in a direction of the current of air flowing from the air outlet 112 toward the air inlet 211 as viewed from a front side (between chain lines shown in FIG. 2). Moreover, the air outlet 112 and the air inlet 211 are located in such positions that a straight line connecting the air outlet 112 and the air inlet 211 (see the arrow) intersects the headrest S22 (the central portion of the headrest body 31) as viewed from the front side.

Figure 6:
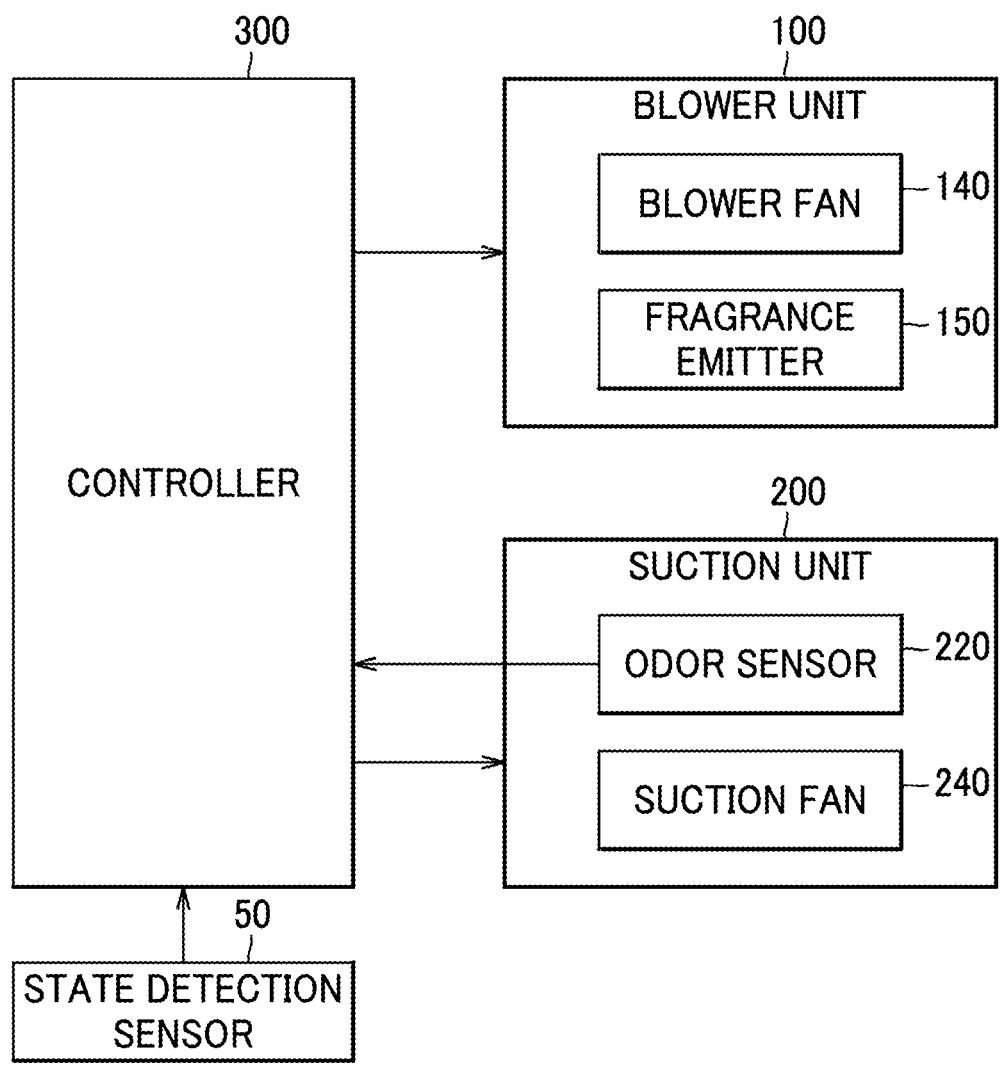
FIG. 6 is a block diagram of control implemented in the car seat.

As shown in FIG. 6, the car seat S1 further includes a controller 300. The controller 300 includes a CPU (Central Processing Unit), a RAM (Random Access Memory), a ROM (Read Only Memory), an input/output circuit, etc., and is connected to the state detection sensors 50 and the odor sensor 220 and thus allowed to acquire measurement values from the state detection to sensors 50 and the odor sensor 220 that is provided in the suction unit 200. It is to be understood that the controller 300 may be located in the car seat S1, or outside of the car seat S1.

The controller 300 controls the operations of the fans 140, 240, such as the on-off control over the fans 140, 240. Further, the controller 300 determines the state of a seated person based on the measurement values of the state detection sensors 50 and/or the detection results of the odor sensor 220, and switches from one fragrance emitter 151 to another (see FIG. 4) depending on the state of the seated person. Specifically, the controller 300 causes the frame 152 of the scenting device 150 to rotate to regulate its phase, thereby switching the fragrance emitter 151 positioned between the blower fan 140 and the air outlet 112, depending on the state of the seated person.

For example, if the controller 300 makes a determination based on the measurement values of the state detection sensors 50 and the odor sensor 220 that the state of a seated person is indicative of an irritated state, then the controller 300 causes the frame 152 of the scenting device 150 to rotate so that a fragrance emitter 151 impregnated with a fragrant scent of jasmine is positioned between the blower fan 140 and the air outlet 112. In this way, the car seat S1 can cause air made fragrant with a scent of jasmine having an emotionally relieving effect to be let out through the air outlet 112 by actuating the blower fan 140.

Also, for example, if the controller 300 makes a determination based on the measurement values of the state detection sensors 50 and the odor sensor 220 that the state of a seated person is indicative of a drowsy state, then the controller 300 causes the frame 152 of the scenting device 150 to rotate so that a fragrance emitter 151 impregnated with a fragrant scent of mint is positioned between the blower fan 140 and the air outlet 112. In this way, the car seat S1 can cause air made fragrant with a scent of mint having an awakening effect to be let out through the air outlet 112 by actuating the blower fan 140.

Next, a description will be given of one example of a process executed by the controller 300.

Figure 7:
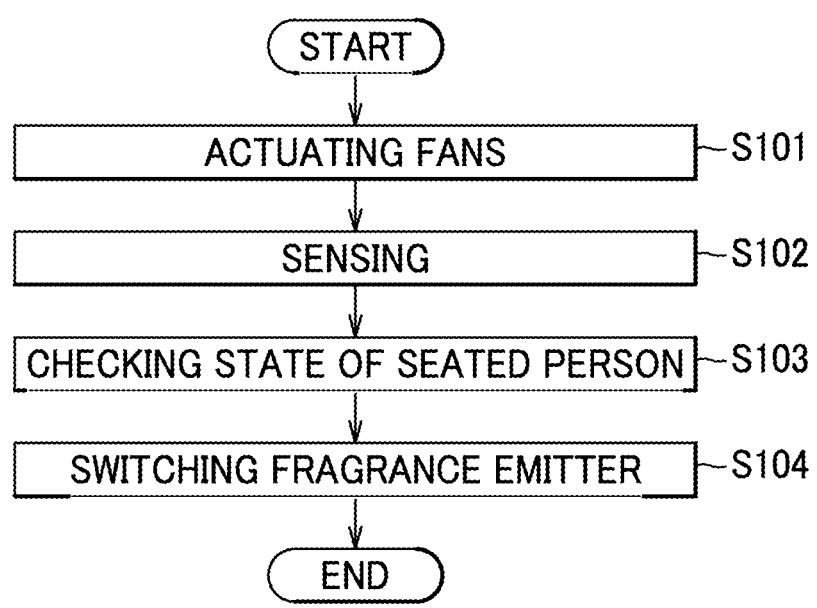
FIG. 7 is a flowchart showing an example of a process to be executed by a controller.

As shown in FIG. 7, the controller 300, first, actuates the blower fan 140 and the suction fan 240 (S101). As a result, a current of air flowing at the front side of the seat upper portion S20, specifically, of the headrest body 31, from the air outlet 112 toward the air inlet 211 is produced.

Next, the controller 300 executes a sensing step of acquiring measurement values from the state detection sensors 50 and/or the odor sensor 220 (S102). Thereafter, the controller 300 determines the state of a seated person based on the acquired measurement values (S103). Then, the controller 300 causes the frame 152 of the scenting device 150 to rotate to thereby switch the fragrance emitter 151 positioned between the blower fan 140 and the air outlet 112, depending on the state of the seated person (S104). Accordingly, the air caused to flow from the air outlet 112 toward the air inlet 211 can be made fragrant with a scent such as to settle an irritated nerve of the seated person or to shake off the drowsiness of the seated person.

According to the first embodiment described above, as shown in FIG. 2, the air made fragrant with a scent and forced out through the air outlet 112 (see the arrows) is drawn in through the air inlet 211, and a current of fragrant air is produced accordingly, so that the scent can be restrained from diffusing. Therefore, the scent can be delivered efficiently to an occupant seated on the car seat S1.

Furthermore, the air outlet 112 and the air inlet 211 are located in such positions that a straight line connecting the air outlet 112 and the air inlet 211 intersects the headrest S22 as viewed from the front side; thus, the fragrant scent flowing from the air outlet 112 toward the air inlet 211, as viewed from the front side, blows on the head of a seated person positioned at the front side of the headrest S22. Accordingly, the scent can be delivered more efficiently to the seated person.

Since the air outlet 112 is located at one of the left and right sides of the seat upper portion S20 and the air inlet 211 is located at the other of the left and right sides of the seat upper portion S20, a current of fragrant air can be caused to flow from one of the left and right sides toward the other of the left and right sides as if it brushes past a seated person. Therefore, the scent can be delivered more efficiently to the seated person.

Since the air outlet 112 is located at a laterally inner side in the automobile C, and the air inlet 211 is located at a laterally outer side in the automobile C, a current of fragrant air is caused to flow from the laterally inner side toward the laterally outer side in the automobile C, as a matter of course. Accordingly, the fragrant air with a scent as let out through the air outlet 112 can be restrained from being delivered unnecessarily to the laterally opposite side that is upstream in the direction of the current of the fragrant air. In addition, with this configuration, even if another car seat S2 is located at the laterally opposite side, upstream of the car seat S1 in the direction of the current of air as in the present embodiment, the scent can be restrained from being delivered to a person seated on this another car seat S2. The same may be said for the car seat S2 configured to be approximately symmetric (left-right reversed) to the car seat S1. Consequently, the scent let out through the air outlet 112 of the car seat S1 can be efficiently delivered only to an occupant seated on the car seat S1; similarly, the scent let out through the air outlet 112 of the car seat S2 can be efficiently delivered only to an occupant seated on the car seat S2.

Since the air outlet 112 and the air inlet 211 are located in the headrest S22, a current of fragrant air can be caused to flow near the head of a seated person. Accordingly, the scent can be delivered more efficiently to the seated person.

Since the air outlet 112 is located at one of the pair of left and right protrusions 32 and the air inlet 211 is located at the other of the pair of left and right protrusions 32, a current of fragrant air can be caused to flow as if it brushes past the nose of a seated person. Accordingly, the scent can be delivered much more efficiently to the seated person.

Since the scenting device 150 is detachable and attachable, the type of scent can be changed according to preferences. Accordingly, in this embodiment, the type of scent can be changed individually for the respective car seats S1, S2.

Since the controller 300 is configured to determine the state of a seated person based on the measurement values of the state detection sensors 50 and to switch from one fragrance emitter 151 to another depending on the state of the seated person, a scent appropriate to the state of the seated person can be delivered.

Similarly, since the controller 300 is configured to determine the state of a seated person based on a detection result of the odor sensor 220 and to switch from one fragrance emitter 151 to another depending on the state of the seated person, a scent appropriate to the state of the seated person can be delivered.

Since the deodorizing filter 130 is located upstream of the scenting device 150 in the direction of a current of air, any smell which air could carry before getting scented can be reduced. Accordingly, such original smell of the air can be restrained from being mixed with the scent imparted by the scenting device 150; therefore, the advantageous effect of the scent provided by the scenting device 150 can be improved.

Next, a description will be given of a second embodiment. Hereinbelow, the same aspects/elements as in the above-described embodiment may be explained, for example, simply by the drawings with the same reference characters used therein, and thus, if deemed appropriate, will not be described in detail, while specific aspects/elements different from those as in the above-described embodiment will be described in detail.

Figure 8:
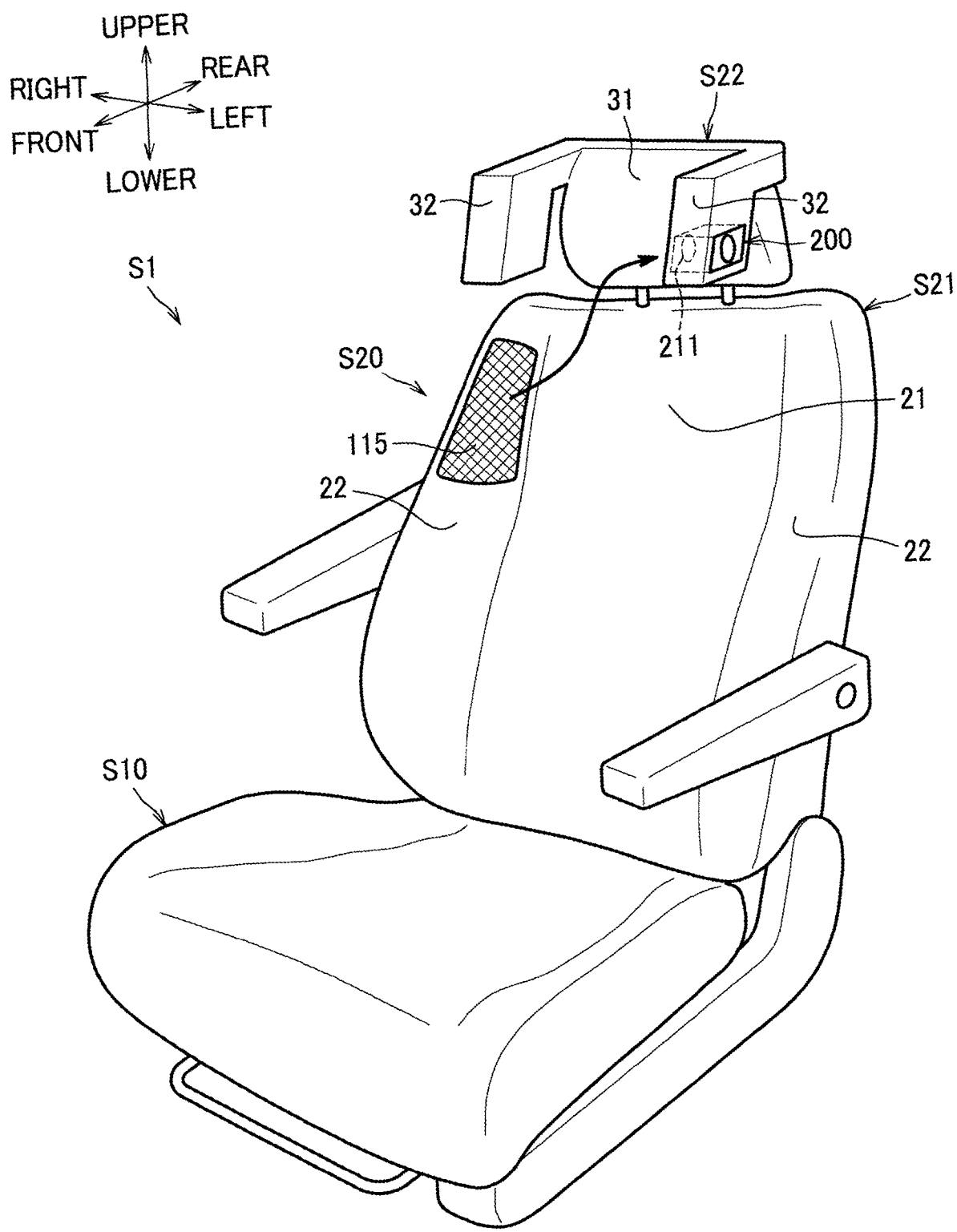
FIG. 8 is a perspective view of a car seat according to a second embodiment.

As shown in FIG. 8, in a car seat S1 according to the present embodiment, an air inlet 211 is located in the headrest S22 of the seat upper portion S20, as in the first embodiment. On the other hand, an air outlet 115 through which to let out air is located in the seat back S21 of the seat upper portion S20.

To be more specific, the seat back S21 includes a seat-back central portion 21, and a pair of left and right seat-back side portions 22 provided at the left and right sides of the seat-back central portion 21 and bulging at their front sides farther frontward than the seat-back central portion 21 does. The air outlet 115 is located at the front side of one of the pair of left and right seat-back side portions 22, specifically, of the right seat-back side portion 22. The air outlet 115 is located, as is the case with the air outlet 112 of the first embodiment, at the right side of the seat upper portion S20, that is, at one of the left and right sides of the seat upper portion S20.

Figure 9:
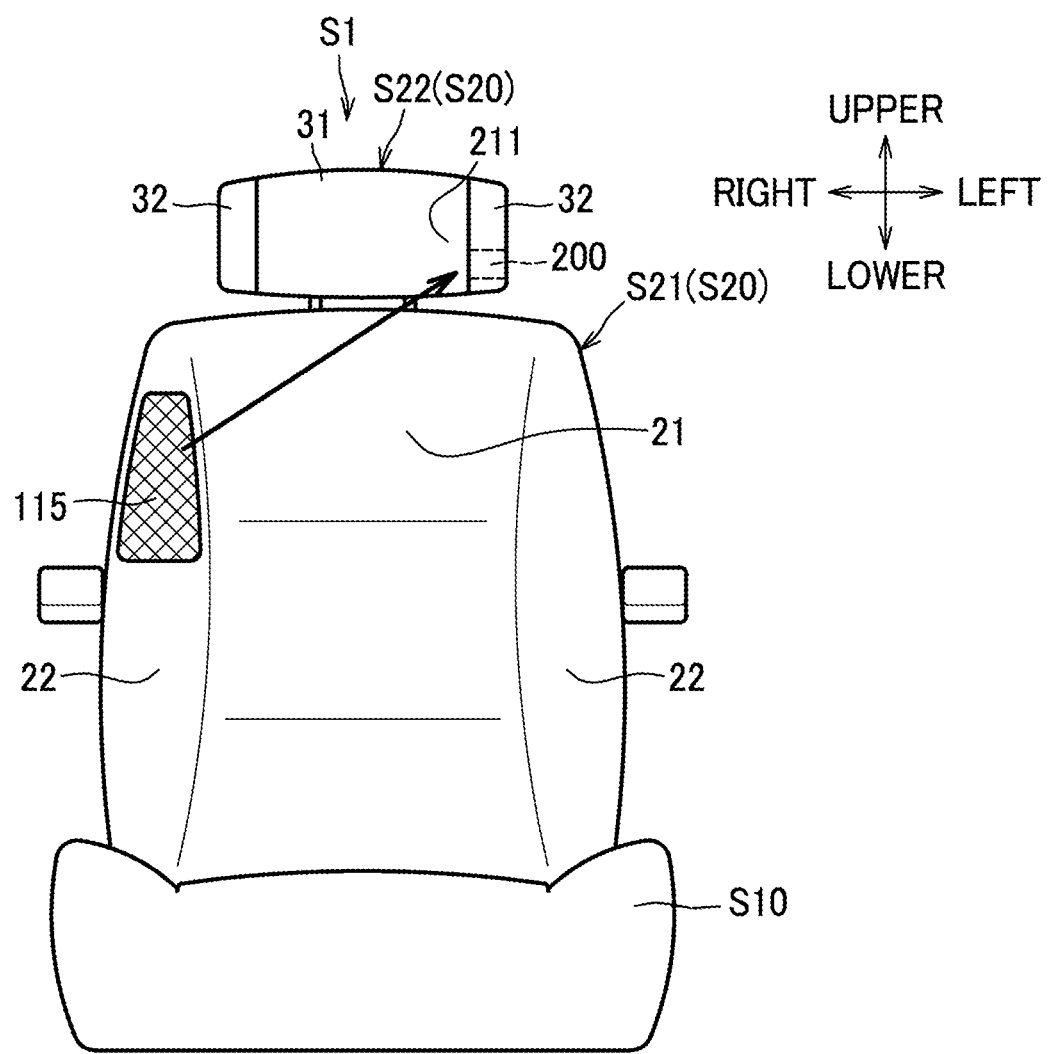
FIG. 9 is a front elevation of the car seat according to the second embodiment.

As shown in FIG. 9, the air outlet 115 and the air inlet 211 are located in such positions that part of the headrest S22, specifically (part of the central portion of the headrest body 31 and the right protrusion 32) is positioned between the air outlet 115 and the air inlet 211 in a direction of the current of air flowing from the air outlet 115 toward the air inlet 211 as viewed from a front side. Moreover, the air outlet 115 and the air inlet 211 are located in such positions that a straight line connecting the air outlet 115 and the air inlet 211 (see the arrow) intersects the headrest S22 (part of the central portion of the headrest body 31) as viewed from the front side.

It is to be understood that in this embodiment, a blower unit (not shown) having the same configuration as that of the first embodiment to let out air made fragrant with a scent through the air outlet 115 is located in the seat back S21. The air outlet 115 may be, for example, an opening formed directly in the case of the blower unit, as is the case with the air outlet 112 of the first embodiment, or a port connected via a duct or the like to an air nozzle of the blower unit.

According to the second embodiment as described above, air made fragrant with a scent and forced out through the air outlet 115 is drawn in through the air inlet 211, so that a current of fragrant air is produced accordingly; therefore, the scent can be restrained from diffusing, and the scent can be delivered efficiently to a seated person.

Furthermore, as the air outlet 115 is located in the seat back S21, and the air inlet 211 is located in the headrest S22, a current of fragrant air can be caused to flow near the head of a seated person. Accordingly, the scent can be delivered more efficiently to the seated person.

In the present embodiment, the air outlet 115 is located in the seat back S21 and the air inlet 211 is located in the headrest S22; however, an alternative arrangement may be implemented in which the air outlet is located in the headrest S22, and the air inlet is located in the seat back S21.

Next, a description will be given of a third embodiment.

Figure 10:
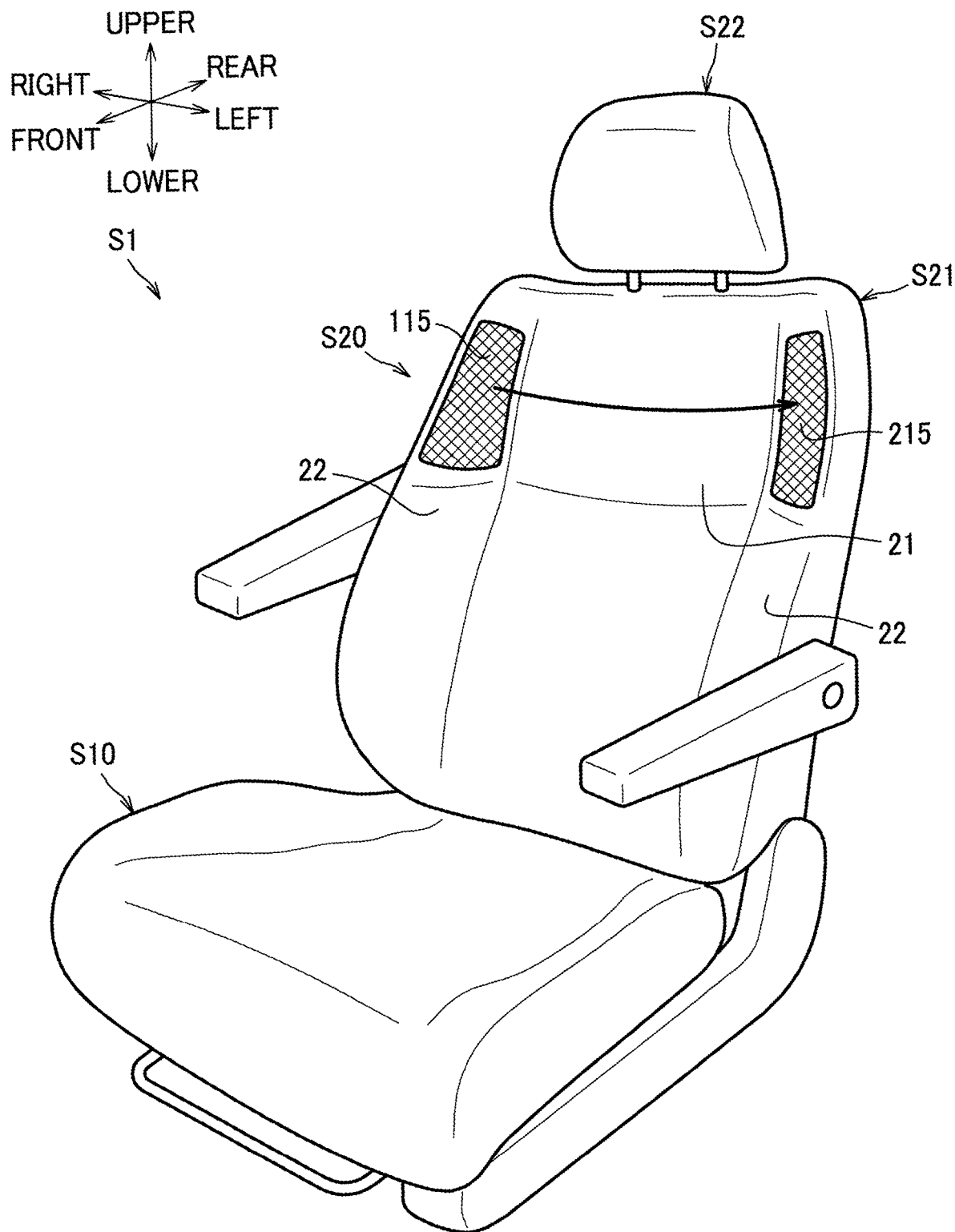
FIG. 10 is a perspective view of a car seat according to a third embodiment.

As shown in FIG. 10, a car seat S1 according to the present embodiment is configured such that an air outlet 115 and an air inlet 215 are located in an upper portion of the seat back S21, i.e., in a position above a center (equidistant from upper and lower extremities) of the seat back S21.

To elaborate, the air outlet 115 is located in one of a pair of left and right seat-back side portions 22, specifically, at a front side of an upper portion of the right seat-back side portion 22, whereas the air inlet 215 is located in the other one of the pair of left and right seat-back side portions 22, specifically, at a front side of an upper portion of the left seat-back side portion 22. The air outlet 115 is located at a right side (i.e., one of the left and right sides) of the seat upper portion S20, while the air inlet 215 is located at a left side (i.e., the other of the left and right sides) of the seat upper portion S20.

Figure 11:
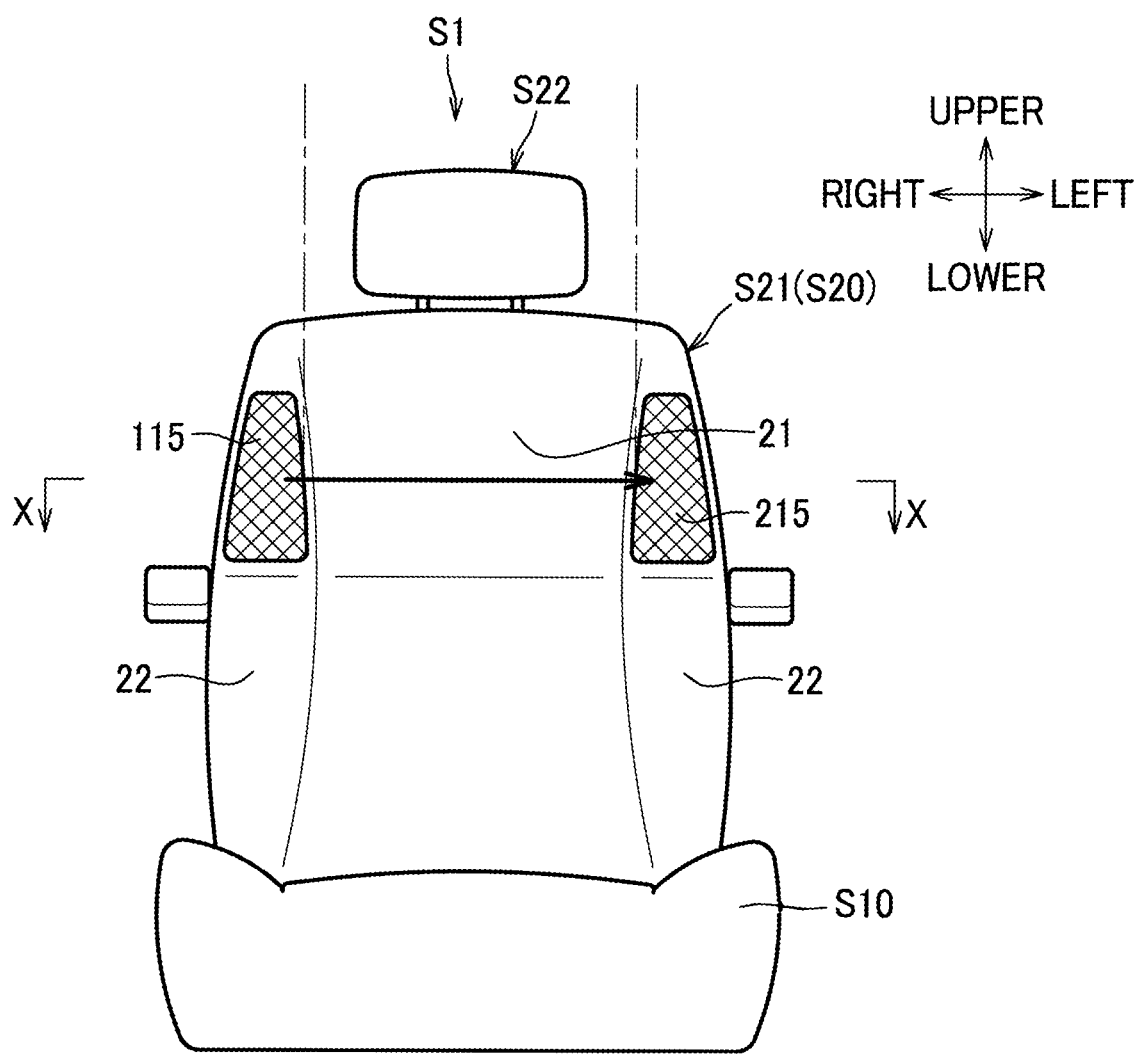
FIG. 11 is a front elevation of the car seat according to the third embodiment.

As shown in FIG. 11, the air outlet 115 and the air inlet 215 are located in such positions that the headrest S22 in its entirety is positioned between the air outlet 115 and the air inlet 215 in a direction from the air outlet 115 toward the air inlet 215 as viewed from a front side (between chain lines shown in FIG. 11).

Figure 12:
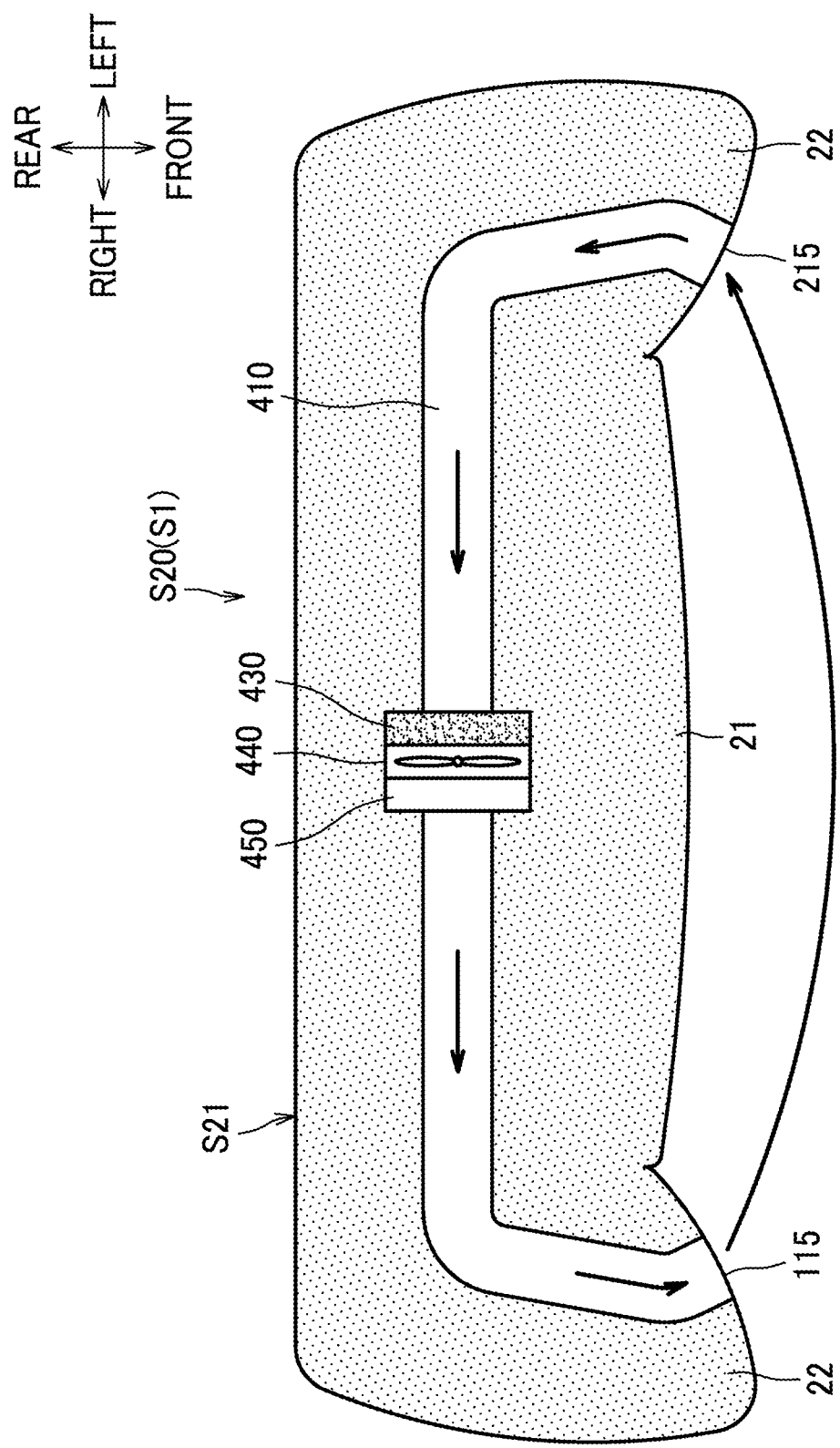
FIG. 12 is a section X-X of FIG. 11.

As shown in FIG. 12, the car seat S1 according to the present embodiment has an air passage 410 provided in the seat upper portion S20, specifically in the seat back S21. The air passage 410 is provided to connect the air inlet 215 and the air outlet 115. In this air passage 410, a deodorizing filter 430, a fan 440, and a scenting device 450 are arranged in this order from an upstream side toward a downstream end in a direction of a current of air flowing through the air passage 410 (see the arrows).

The deodorizing filter 430 is a filter for removing odor from air taken through the air inlet 215 into the air passage 410.

The fan 440 is a fan that produces a current of air flowing at a front side of the seat upper portion S20 (seat back S21) from the air outlet 115 toward the air inlet 215. To be more specific, the fan 440 forces air to flow in the air passage 410 from the air inlet 215 toward the air outlet 115, so that air is let out through the air outlet 115, while air is drawn in through the air inlet 215. In the car seat S1 of this embodiment, only one fan 440 is provided.

The scenting device 450 scents air to be forced out through the air outlet 115. The scenting device 450 does not include any such fragrance emitters 151 as provided in the scenting device 150 of the first embodiment, and disclosed here by way of example is a member made of an air-permeable material impregnated with a fragrant scent.

According to the third embodiment as described above, air made fragrant with a scent and forced out through the air outlet 115 is drawn in through the air inlet 215; accordingly, a to current of fragrant air is formed and the scent is restrained from diffusing, whereby the scent can be delivered efficiently to a seated person.

Furthermore, as the air outlet 115 and the air inlet 215 are located in an upper portion of the seat back S21, a current of fragrant air can be caused to flow near the head of a seated person. Therefore, the scent can be delivered more efficiently to the seated person.

Moreover, as only one fan 440 is provided, a unit for producing a current of air flowing from the air outlet 115 toward the air inlet 215 can be made compact and smaller as compared with an alternative configuration in which a plurality of fans are provided.

In contrast, the configuration as in the above-described first embodiment includes the blower fan 140 and the suction fan 240 as "(at least one) fan", and the blower unit 100 and the suction unit 200 are provided separately; accordingly, the need for providing an air passage connecting the air inlet and the air outlet in the seat upper portion S20 can be saved. Therefore, the rigidity of the seat upper portion S20 can be enhanced.

Although the embodiments of the invention have been described above, the present invention is not limited to the above-described embodiments, and can be modified where appropriate for practical applications.

For example, the arrangement of the air outlet and the air inlet may be reversed laterally from the arrangement in each of the embodiments.

In the setup constructed as in the first embodiment, the controller 300 may be configured to actuate first the suction fan 240 only, without actuating the blower fan 140, to cause the suction unit 200 to take in air in the vehicle, measure its odor by using the odor sensor 220, and if the measurement value of the odor sensor 220 is not lower than a predetermined level, then continue to actuate the suction fan 240 for a predetermined period of time to deodorize the air in the vehicle by using the second deodorizing filter 230, and thereafter actuate the blower fan 140 to force air made fragrant with a scent to come out through the air outlet 112. Herein, the controller 300 may be configured to skip the deodorizing step if the measurement value of the odor sensor 220 is lower than the predetermined value, and actuate the blower fan 140 to force air made fragrant with a scent to come out through the air outlet 112.

Although the state detection sensors 50 are located at both of the seat cushion S10 and the seat upper portion S20 in the first embodiment, the state detection sensor may be located at only one of the seat cushion and the seat upper portion. Alternatively, the seat may be configured to comprise no state detection sensor.

Although the blower unit 100 including one blower fan 140 is provided in the first embodiment, an alternative configuration with a plurality of blower fans may be feasible. The same goes for the suction fan in the suction unit. Although the number of the blower fan(s) 140 and the number of the suction fan(s) 240 provided in the first embodiment are the same, the numbers may be different. In the setup configured as in the third embodiment, a plurality of fans 440 may be provided.

Although the scenting device 150 in the first embodiment is configured to be removable from the seat upper portion S20 by first removing the blower unit 100 from the seat upper portion S20 and then removing the scenting device 150 from the case 110 of the blower unit 100, the scenting device may be configured to be directly attachable to and detachable from the seat upper portion such as the headrest, the seat back, etc. It is to be understood that if the scenting device 150 or at least part of the fragrance emitters 151, for example, is not attached in the car seat S1, air to be forced out through the air outlet 112 is not made fragrant with a scent; however, in this case as well, a current of air flowing at a front side of the seat upper portion S20 from the air outlet 112 toward the air inlet 211 is produced by actuating the fans 140, 240, so that local or personal air-conditioning feature may be available.

Although the controller 300 in the first embodiment is configured to automatically change the scent depending on the state of a seated occupant, an alternative configuration may be feasible such that the scent can be changed by a seated person's own operation according to his/her preferences. Optionally, the modes of changing the scent may be provided in a manner switchable between a mode in which the scent is automatically changed and a mode in which the scent is changed by a seated person's manual operation.

The air outlet located in the headrest S22 or the seat back S21 of the seat upper portion S20 in the above-described embodiments may alternatively be located in the armrest S23 of the seat upper portion S20. The same goes for the air inlet.

In the above-described embodiments, the car seat S1 comprising the seat back S21 and the headrest S22 provided separately is illustrated by way of example; however, a seat having a seat back and a headrest formed integrally in one piece, for example, like an air-conditioning seat as described in the Patent document 1, may be compatible.

In the above-described embodiments, the car seat S1 installed in the automobile C is illustrated as an example of a seat according to the invention, but the seat may be a vehicle seat as installed in any vehicle other than an automobile, such as rail cars, ships or aircrafts, etc. Moreover, the seat is not limited to a vehicle seat, but may be a seat as used in amusement facilities, in relaxation facilities, or at home.

The elements explained in the above-described embodiments and modified examples may be implemented in combination where appropriate.

The invention claimed is:

1. A seat with a seat cushion and a seat upper portion provided above the seat cushion, the seat upper portion including a seat back and a headrest, the seat comprising:
   an air outlet located in the seat upper portion to let out air therethrough;
   an air inlet located in the seat upper portion to draw in air therethrough;
   at least one fan configured to produce a current of air flowing at a front side of the seat upper portion from the air outlet toward the air inlet; and a scenting device configured to scent air to be forced out through the air outlet, wherein the air outlet and the air inlet are located in such positions that at least part of the headrest is positioned between the air outlet and the air inlet in a direction of the current of air flowing from the air outlet toward the air inlet as viewed from a front side.

2. The seat according to claim 1, wherein the air outlet and the air inlet are located in such positions that a straight line connecting the air outlet and the air inlet intersects the headrest as viewed from the front side.

3. The seat according to claim 1, wherein the air outlet is located at one of left and right sides of the seat upper portion, and wherein the air inlet is located at another of the left and right sides of the seat upper portion.

4. The seat according to claim 3, wherein the seat is installed in a vehicle, wherein the air outlet is located at a laterally inner side in the vehicle, and wherein the air inlet is located at a laterally outer side in the vehicle.

5. The seat according to claim 1, wherein the air outlet and the air inlet are located in the headrest.

6. The seat according to claim 5, wherein the headrest includes a headrest body located at a rear side of a head of a seated person, and a pair of left and right protrusions protruding from the headrest body frontward, the pair of left and right protrusions being located at left and right sides of the head of the seated person such that the head of the seated person is positioned therebetween, wherein the air outlet is located at one of the pair of left and right protrusions, and wherein the air inlet is located at another of the pair of left and right protrusions.

7. The seat according to claim 1, wherein the air outlet is located in one of the seat back and the headrest, and wherein the air inlet is located in another of the seat back and the headrest.

8. The seat according to claim 1, wherein the air outlet and the air inlet are located in an upper portion of the seat back.

9. The seat according to claim 1, wherein the scenting device is detachable and attachable.

10. The seat according to claim 1, comprising:

a state detection sensor located at at least one of the seat cushion and the seat upper portion to acquire a measurement value for determining a state of a seated person; and a controller, wherein the scenting device includes fragrance emitters of a plurality of kinds, and wherein the controller is configured to determine the state of the seated person based on the measurement value, and to switch from one fragrance emitter to another of the fragrance emitters depending on the state of the seated person.

11. The seat according to claim 1, comprising:

an odor sensor located downstream of the air inlet in the direction of the current of air; and a controller, wherein the scenting device includes fragrance emitters of a plurality of kinds, and wherein the controller is configured to determine a state of a seated person based on a detection result of the odor sensor, and to switch from one fragrance emitter to another of the fragrance emitters depending on the state of the seated person.

12. The seat according to claim 1, comprising a deodorizing filter located upstream of the scenting device in the direction of the current of air.

13. The seat according to claim 1, wherein the fan includes a blower fan for forcing air out through the air outlet, and a suction fan for forcing air in through the air inlet.

14. The seat according to claim 1, comprising an air passage provided in the seat upper portion and connecting the air inlet and the air outlet, wherein the fan is located in the air passage and configured to force air from the air inlet toward the air outlet.

* * * * *